Nov. 17, 1970  F. W. KELLEY, JR., ET AL  3,541,423
MARGIN ANGLE DETECTOR
Filed Jan. 10, 1969

INVENTORS:
FRED W. KELLEY, JR.,
GEORGES R.E. LEZAN,
BY Albert S. Richardson Jr.
ATTORNEY Nov. 17, 1970   F. W. KELLEY, JR., ET AL   3,541,423
MARGIN ANGLE DETECTOR
Filed Jan. 10, 1969
3 Sheets-Sheet 2

INVENTORS:
FRED W. KELLEY, JR.,
GEORGES R. E. LEZAN,
BY Albert S. Richardson Jr.
ATTORNEY

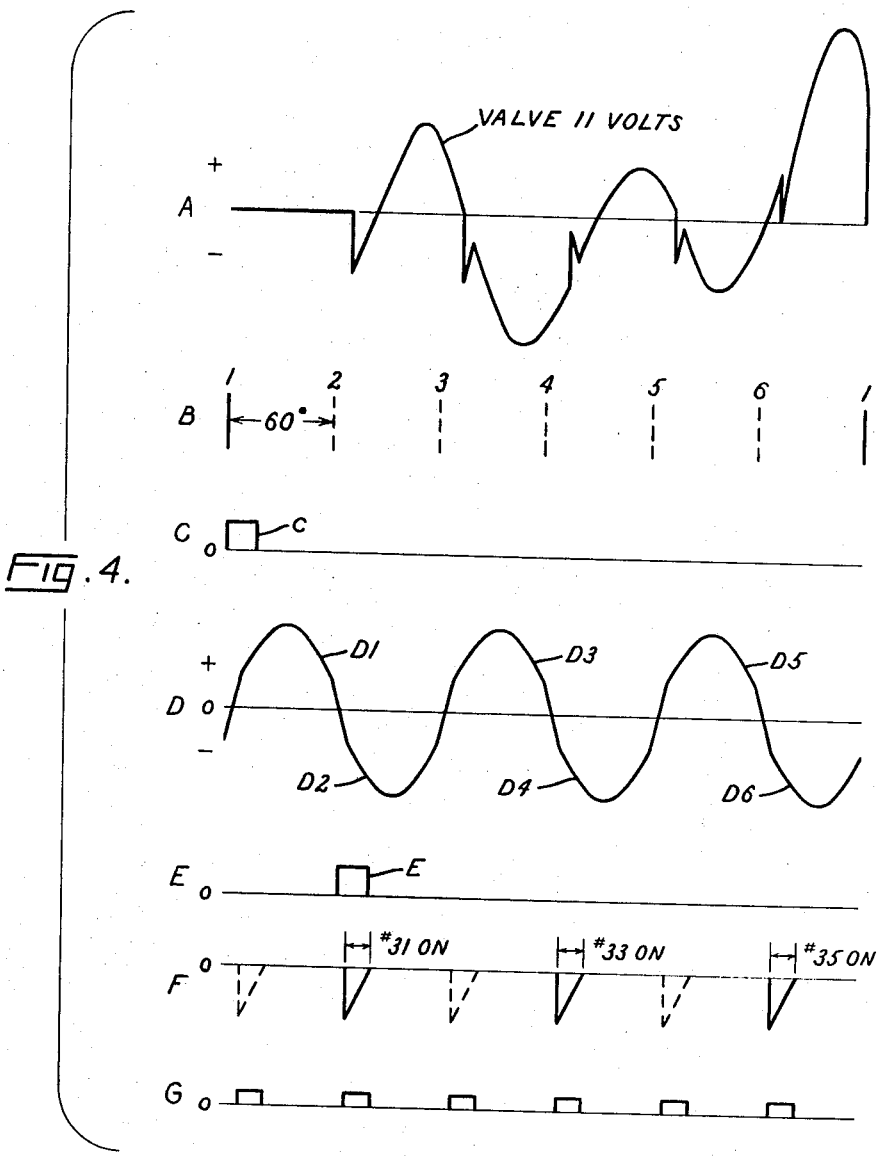

United States Patent Office
3,541,423
Patented Nov. 17, 1970

3,541,423
MARGIN ANGLE DETECTOR
Fred W. Kelley, Jr., Media, Pa., and Georges R. E. Lezan, Cherry Hill, N.J., assignors to General Electric Company, a corporation of New York
Filed Jan. 10, 1969, Ser. No. 790,246
Int. Cl. H02m *1/02, 1/08, 1/18*
U.S. Cl. 321—5
13 Claims

ABSTRACT OF THE DISCLOSURE

To monitor the intervals of inverse voltage across the electric valves in an electric power converter immediately following their respective periods of forward conduction, samples of the anode-to-neutral and the cathode-to-neutral voltages of each valve are fed to an associated summation circuit including an asymmetrically conductive device which is forward biased by the sampled difference when inverse voltage exists on that valve, and a plurality of similar summation circuits are connected in common to means for producing a train of output signals which coexist with the intervals of inverse voltage on the respective valves of the converter. In one embodiment, the asymmetrically conductive devices are thyristors which are respectively triggered at the ends of the conducting periods of the corresponding valves.

---

This invention relates to means for detecting the margin angle of electric power conversion apparatus generally, and more particularly it relates to means for detecting margin angle of either (1) D-C to A-C converters of a type known popularly as line-voltage commutated inverters, or (2) A-C to A-C converters of a type known popularly as harmonic frequency multipliers.

Converters designed to change the form of electric power from direct current to alternating current or from polyphase alternating current of fundamental frequency to single-phase alternating current of harmonic frequency are old and well known in the art. The conversion is accomplished by appropriately controlling a plurality of periodically conducting, sequentially fired electric valves that are interconnected in a bridge configuration between D-C and A-C terminals, the latter being connected by means of a power transformer to a polyphase system of alternating voltage with which the valve firings are synchronized. In modern practice each valve typically comprises one or more solid-state gate-controlled switching components known as semiconductor controlled rectifiers or thyristors.

In operation, such a valve has a non-conductive or blocking state, in which it presents very high impedance to the flow of current, and a turned-on state in which it freely conducts forward current. It can be switched abruptly from the former state to the latter by the concurrence of a forward bias on its main electrodes (anode at a positive potential with respect to cathode) and a control or trigger signal on its gate. The time at which the valve is turned on, measured in electrical degrees from the cyclically recurring instant at which its anode voltage first becomes positive with respect to cathode, is known as the "firing angle." The magnitude of the output voltage of the bridge can be varied by retarding or advancing the firing angle as desired.

Once turned on, a valve will continue conducting until "forward" current is subsequently extinguished by the action of the external circuit in which the valve is connected. This turn off process can be referred to as "commutation." In the case of electronic valves such as thyristors, successful switching from conducting to non-conductive states requires that reapplication of forward anode-to-cathode voltage be delayed after forward current decreases to zero until the valve has had time to regain completely its blocking capability. The interval of time required for this purpose is generally known as "turn-off time," and to ensure reliable commutation the converter "margin angle" has to be at least as long.

The interval of time beginning at the moment that forward current in an outgoing (relieved) valve is reduced to zero and ending when the main electrodes of this valve are next subjected to forward voltage is herein referred to as the deionization or margin angle of the converter. This is the time actually available during each operating cycle for turning off a valve, and it equals the turn-off time of the valve plus any ensuing period of reverse voltage across the turned off device. If the margin angle were not sufficient to allow the outgoing valve to recover its ability to block forward voltage, this valve would prematurely resume conduction which event is herein called a commutation failure.

In practice a valve will be subjected to inverse voltage (anode at a negative potential with respect to cathode) for a variable interval immediately following each period of forward current conduction. The length of this interval is a measure of margin angle. It depends on a number of variable and interrelated parameters such as the firing angle, the commutation or overlap angle (i.e., the time between an incoming or relieving valve being turned on and the outgoing valve subsequently turning off), and the nature of the load impedance (e.g., power factor and ohmic magnitude). In connection with schemes for controlling or protecting converters of the type herein contemplated, it is sometimes desirable to detect directly the duration of the aforesaid interval of inverse voltage, and it is a general objective of the present invention to provide improved means for accomplishing this result.

A more specific objective is to provide a feedback signal representing the actual margin angle of an harmonic frequency multiplying converter for use in the improved protective scheme that is the claimed subject matter of a copending patent application 788,718 filed on Jan. 3, 1969, for G. R. Lezan and assigned to the assignee of the present application.

Another objective is to provide novel means for accurately reproducing the waveform of the inverse voltage that is applied across each valve of a converter immediately after each period of forward conduction.

In carrying out the invention in one form, we provide means for detecting the margin angle of a converter that comprises six valves interconnected and arranged to form a 3-phase double-way bridge having a set of three A-C terminals and a pair of D-C terminals. In this configuration three of the valves have their cathodes connected in common to a first one of the D-C terminals, and the remaining three valves have their anodes connected in common to the other D-C terminal. The converter also includes means for connecting the A-C terminals of the bridge to a 3-phase alternating voltage system, and during each cycle of that voltage the respective valves are turned on in a predetermined sequence at intervals of approximately 60 electrical degrees.

In the margin angle detector, a secondary voltage representing the voltage between the first D-C terminal of the bridge and a neutral of the 3-phase system is derived, and by means of three summation circuits this secondary voltage is substracted from each of three others which respectively represent the three A-C terminal-to-neutral voltages. The three summation circuits include three asymmetrically conductive devices, respectively, and each device is poled to be forward biased by the voltage difference that exists when there is inverse voltage across the corresponding one of the three valves whose cathodes are connected in common to said first D-C terminal. These summation circuits are connected in parallel to suitable means for deriving a train of unipolarity voltages comprising a composite of the difference voltages individually developed during the conducting intervals of their respective devices.

A similar arrangement is provided for deriving another train of unipolarity voltages that are replicas of the inverse voltage across the remaining three valves, and the two trains are merged to provide a series of output signals whose respective durations indicate the actual margin angle of the converter when each of its six valves turns off in turn. In this manner margin angles up to approximately 60° can be correctly detected. Such a maximum limit is adequate for virtually all practical applications of margin angle detectors because the critical turn-off times of typical high power solid-state switching components commercially available today are not approached until the margin angle is less than one-sixth this size.

In one embodiment of the invention, the aforesaid asymmetrically conductive devices comprises thyristors, and means is provided for triggering each of these thyristors in turn when forward current in the corresponding valve of the converter decreases to zero at the end of a period of conduction. When triggered, each thyristor conducts throughout the relevant interval of inverse voltage and then reverts to a non-conductive state, thereby ensuring that subseuqent intervals of inverse voltage across a turned-off valve will not be reproduced in the output signals of the margin angle detector.

The invention will be better understood and its various objects and advantages will be more fully appreciated from the following description taken in conjunction with the accompanying drawings in which:

FIGS. 4A through 4G are time charts of certain voltages and signals during one full cycle of operation of the illustrated embodiment of our invention.

Figure 1:
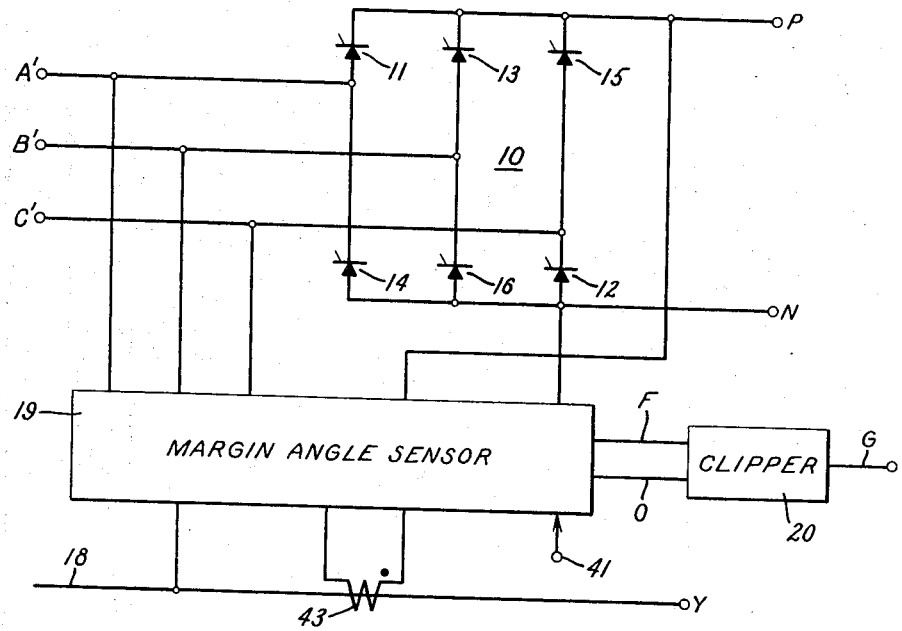
FIG. 1 is a schematic circuit diagram of a 3-phase, double-way, 6-pulse bridge in conjunction with which our margin angle detector can be advantageously used in practice.

Referring now to FIG. 1, there is shown for purposes of illustrating one practical embodiment of a margin angle detector a bridge 10 comprising six identical valves numbered 11 through 16 and arranged in a 3-phase double-way 6-pulse configuration. The cathodes of the odd-numbered valves are connected in common to an upper D-C terminal P of the bridge 10, and the anodes of the even-numbered valves are connected in common to another D-C terminal N. The anode of valve 11 and the cathode of valve 14 are both connected to a first A-C terminal A′ of the bridge. The anode of valve 13 and the cathode of valve 16 are both connected to a second A-C terminal B′, and the anode of valve 15 and the cathode of valve 12 are both connected to a third A-C terminal C′. While each of the valves has been illustrated by a single symbol, in practice it can comprise a plurality of separate semiconductor controlled rectifiers connected in series and/or in parallel with one another and suitably arranged to operate in unison.

The bridge 10 is part of an electric power converter that includes a polyphase power transformer for connecting the set of A-C terminals A′, B′ and C′ to a system of 3-phase sinusoidal voltage of fundamental frequency (e.g., 60 hertz). The power transformer itself and the inductances in series therewith are not shown in FIG. 1. If the converter were a rectifier operating in the fourth quadrant (i.e., inverting), the D-C terminals P and N of the bridge 10 would be connected via a D-C link to a remote source of current (not shown); if the converter were being operated as an harmonic freqency multiplier both of these terminals would be connected to one side of a single-phase A-C load circuit (not shown) whose other side is suitably connected to the polyphase alternating voltage system, as by way of a terminal Y and a neutral conductor 18. An example of the bridge 10 being used in an harmonic frequency multiplying converter is shown in the above-mentioned Lezan application.

By supplying the respective control electrodes (gates) of the six valves 11–16 with an appropriately timed family of cyclically generated control or trigger signals, the valves are turned on in numerical sequence in synchronism with the voltage of the polyphase system (a conventional phase rotation A′–B′–C′ is assumed), and consequently the flow of power through the converter is controlled as desired. Any suitable means can be used for cyclically generating the requisite trigger signals and for determining their characteristic firing angle; a circuit advantageously used in practice is disclosed in U.S. Pat. 3,095,513, Lezan. When thus turned on, each valve continues conducting until forward current therein is decreased to zero by a cyclic commutation process, and each conducting period is immediately followed by an interval of inverse anode-to-cathode voltage across that valve. We provide means for monitoring this inverse voltage interval, which is a measure of the actual margin angle at which the converter is operating.

Figure 2:
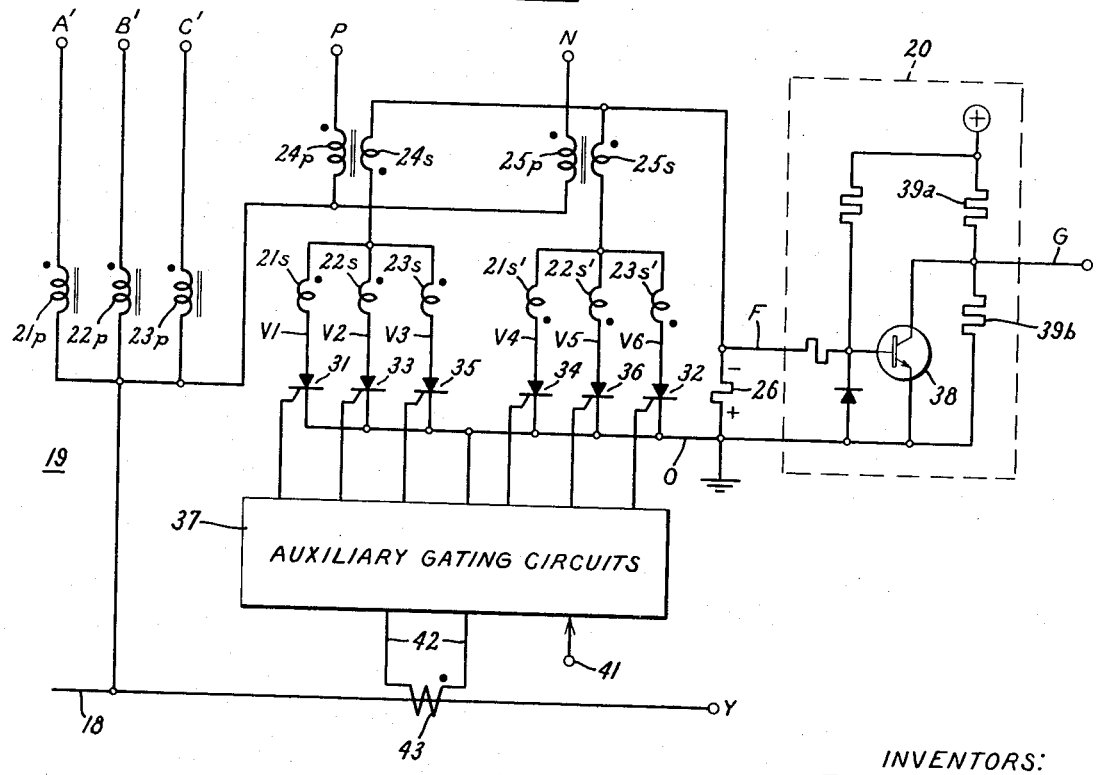
FIG. 2 is a schematic circuit diagram of the margin angle detector shown in block form in FIG. 1.

The inverse voltage interval monitor is shown in FIG. 1 as a block 19 labeled "margin angle sensor" and a block 20 labeled "clipper." As will soon be apparent from the description of FIG. 2, the margin angle sensor 19 is designed to produce between lines F and O during each operating cycle of the converter a series of six output signals that are true replicas of the inverse voltages across the valves 11–16 immediately following their respective periods of conduction. Where only the individual duration and not the waveform of these output signals is of interest, they are fed to the clipping means 20 which produces a train of discrete feedback signals G of constant amplitude and frequency but variable duration. The duration of each feedback signal will vary directly with the size of the margin angle. For metering or control purposes, the feedback signal train can be filtered to produce a resultant signal whose average magnitude is the analog of margin angle. Alternatively, it is useful in its raw form in conjunction with the digital logic and timing circuits such as those employed in the protective scheme of the above-mentioned Lezan application.

Details of one practical embodiment of the margin angle sensor 19 and the clipper 20 have been shown in FIG. 2 and will now be described. The sensor comprises five potential transformers 21–25 having the same turns ratio (e.g., 40:1), six asymmetrically conductive devices 31–36, a resistor 26, and appropriate interconnections. The first three potential transformers are each provided with a primary winding ($p$) and duplicate secondary windings ($s$ and $s'$). Their primary windings $21p$, $22p$, and $23p$ are connected between the respective A-C terminals A′, B′, C′ of the bridge 10 and a given reference point of the polyphase alternating voltage system. Preferably the reference point is the neutral conductor 18. (If no system neutral is readily available, an artificial one can be established by known means.) In this manner two sets of secondary voltages representing the actual voltages between the respective A-C terminals and neutral are derived by the secondary windings $21s$, $22s$, $23s$ and $21s'$, $22s'$, $23s'$. These voltages are of course proportional to the respective anode-to-neutral voltages of the odd-numbered valves 11, 13 and 15 and to the respective cathode-to-neutral voltages of the even-numbered valves 14, 16 and 12, respectively.

As is illustrated in FIG. 2, the primary windings $24p$ and $25p$ of the fourth and fifth potential transformers are connected between the respective D-C terminals P and N of the bridge 10 and the neutral 18. Thus the secondary winding $24s$ derives a secondary voltage representing the voltage between terminal P and neutral, which is the cathode-to-neutral voltage of the odd-numbered valves, while the secondary winding 25s derives a secondary voltage representing the voltage between the terminal N and neutral, which is the anode-to-neutral voltages of the even-numbered valves.

The various secondary windings of potential transformers 21–25 and the devices 31–36 are interconnected as shown. A wire V1 serially connects the first device 31 to winding 21s, thereby forming a first series subcircuit, and a first summation circuit is formed by connecting the winding 24s in voltage-subtracting series relationship with this subcircuit. Adjacent ends of the two windings 21s and 24s are dotted so that the potential developed at wire V1 is relatively positive whenever the potential of P is more positive than that of A' (corresponding to inverse voltage across valve 11), and the device 31 is poled to be forward biased by the resulting secondary voltage difference. This pattern is repeated in a combination including the third device 33, a wire V2 and winding 22s, and again in a combination including the fifth device 35, a wire V3 and winding 23s.

The three summation circuits thus formed are connected in parallel with one another and with the resistor 26 between a wire F and a common bus O. Whenever any one of the devices 31, 33, or 35 is conducting, the difference voltage in its summation circuit will be impressed on the resistor 26 with a polarity that makes wire F negative with respect to O. Although the devices 31–36 could be diodes in some applications of our invention (see below), they will presently be described as control thyristors, and by means of cyclically operative auxiliary gating circuits 37, each is triggered in turn when the similarly identified valve of the bridge 10 turns off at the end of its forward-current conduction period. Consequently the device 31 is conducting throughout the inverse voltage interval that immediately follows each conducting period of valve 11, thereby connecting the secondary windings 24s and 21s to the resistor 26 at a time when their voltage difference is a replica of that inverse voltage. In a similar fashion, but commencing one-third cycle later, the device 33 is conducting during the inverse voltage interval that immediately follows each conducting period of valve 13, thereby connecting the secondary windings 24s and 22s to the same resistor at a time when their voltage difference is a replica of that inverse voltage. As a result, there is derived across resistor 26 a train of negative voltages comprising the composite of replica voltages respectively developed by the first, second, and third summation circuits previously described. This train is shown in solid lines in FIG. 4F for one full cycle of a converter operating under typical conditions.

As is apparent in FIG. 2, a similar arrangement is provided for deriving another voltage train (shown dotted in FIG. 4F) comprising a composite of fourth, fifth and sixth voltages that are individually the replicas of the inverse voltages across the even-numbered valves, 14, 16 and 12 of the bridge 10 immediately following their respective periods of conduction. The secondary winding 25s is connected in voltage-subtracting relationship with the parallel array of subcircuits respectively including the windings 21s', 22s' and 23s', and opposite ends of the seriesed windings are dotted so that the potential developed at each of the wires V4, V5 and V6 is positive with respect to F whenever the potential of terminal N is more negative than that of the respectively associated A-C terminal. The even-numbered devices 34, 36 and 32 are forward biased by these replica voltages, respectively, and each is triggered in turn when the corresponding valve turns off.

All of the thyristors 31–36 are poled in agreement so as to conduct current in the same direction through the common resistor 26, and consequently a series of six unipolarity output signals is produced at F during each operating cycle of the converter. The waveform of each signal is a true replica of the inverse voltage across a different one of the six valves in the bridge 10 immediately following its period of forward current conduction. If desired, all or part of the resistance of 26 could be distributed in the separate subcircuits of the six summation circuits to enable the respective replica voltages to be individually monitored. As is indicated in FIG. 2, the negative output signals at F are reshaped to rectangular pulses G of constant positive magnitude by the clipper 20 which preferably comprises a normally conducting transistor 38 whose emitter-base circuit is connected across resistor 26 so as to be reversed biased whenever there is any negative potential at F. When thus turned off, the transistor 38 allows the feedback signal G to appear, the magnitude of G being determined by a voltage divider 39a, 39b connected between a relatively positive terminal of a suitable control power source and the common bus O. The resulting feedback signals are shown in FIG. 4G where they are seen to coexist with the replica voltages F. Thus the duration of each feedback signal represents the margin angle of the converter.

In operation, each of the thyristors 31–36 of the illustrated margin angle sensor 19 turns on whenever the similarly identified valve among the valves 11–16 of the bridge 10 turns off, and it will stay on until the end of the immediately ensuing interval of inverse voltage across that valve. It is not on, however, during other portions of a cycle of converter operation when inverse voltage may again appear across the corresponding valve. This is illustrated in FIGS. 4A and 4F for a case where our invention is used to detect the margin angle of a frequency tripling converter, it being assumed that the converter is operating in its "continuous" mode with each valve of the bridge 10 conducting for a period of about 70°. FIG. 4A is an approximate representation of the resulting anode-to-cathode voltage across one of the valves (No. 11) under typical load conditions. FIG. 4F shows that the corresponding thyristor (No. 31) is on only during the first of several different intervals of inverse voltage across that valve, and therefore the substantial but irrelevant inverse voltages that exist during the other intervals are not reflected by the output signals F. Consequently, the output signals are a true picture of margin angle.

To ensure turn-on of the devices 31–36 at the proper times, they are cyclically triggered by the auxiliary gating circuits 37 when the respective valves 11–16 turn off at the end of each period of conduction. This result can be accomplished by any suitable circuitry. For example, the circuits 37 could be designed to supply trigger signals to the respective thyristors 31–36 in response to forward current in the corresponding valves decreasing to zero. In one practical embodiment that is particularly useful in conjunction with harmonic frequency multipliers, the operation of the auxiliary gating circuits is synchronized with that of the gate pulse generator (not shown) used for triggering the main valves 11–16 and is supervised by the harmonic load current. For this purpose the gating means 37 is coupled via a connection 41 to the main gate pulse generator and via a pair of wires 42 and a current transformer 43 to a load current conductor, and it is internally constructed in accordance with the schematic diagram shown in more detail in FIG. 3.

Figure 3:
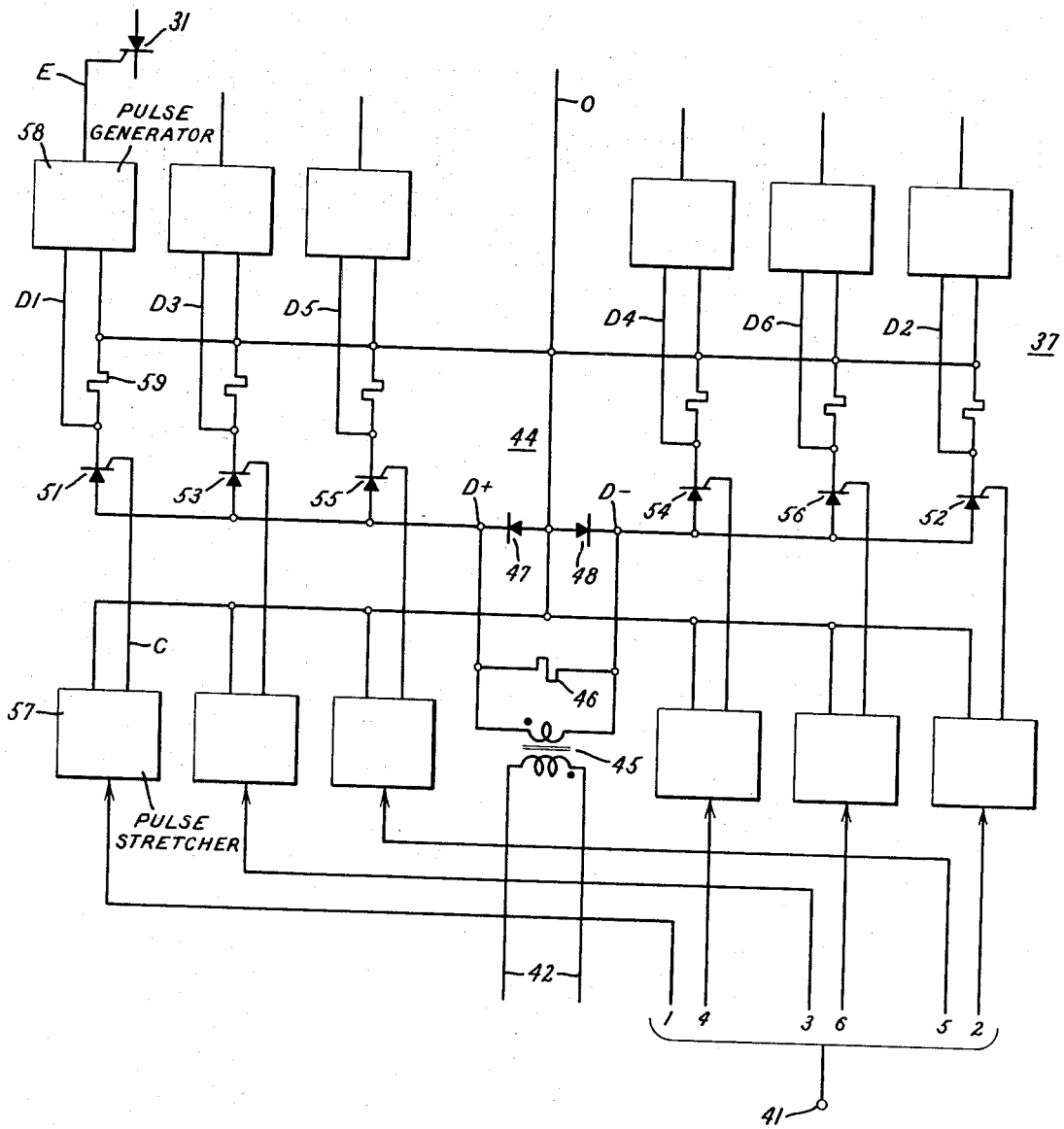
FIG. 3 is a schematic circuit diagram, partly in block form, of the auxiliary gating circuits shown as a single block in FIG. 2.

As it is shown in FIG. 3, the auxiliary gating means 37 comprises means 44 for deriving an alternating control voltage from the secondary load current supplied over wires 42, a bank of six periodically conducting controlled rectifiers 51–56 connected in circuit with the means 44, an array of six duplicate pulse stretchers 57 for cyclically turning on the respective rectifiers 51–56 in numerical sequence, and an array of six duplicate pulse generators 58 for producing a family of thyristor trigger signals in response to the rectifiers 51–56 turning off in turn. More specifically, the control voltage deriving means 44 comprises an auxiliary transformer 45 whose secondary is shunted by a resistor 46 to produce between points D+ and D— an alternating voltage in phase with the third harmonic load current of the frequency tripling converter. Whenever any one of the odd-numbered valves 11, 13, or 15 of the bridge 10 is conducting load current, point D+ will be relatively positive, thereby forward biasing the three controlled rectifiers 51, 53 and 55 whose anodes are connected to D+ and whose cathodes are connected to D— via individual resistors 59, the common bus O, and a diode 48. Similarly, whenever one of the even numbered valves 14, 16, or 12 is conducting load current, point D— will be relatively positive, thereby forward biasing the three controlled rectifiers 54, 56 and 52 whose anodes are connected to D— and whose cathodes are connected to D+ via individual resistors 59, a common bus O, and a diode 47.

The six controlled rectifiers 51–56 in the gating means 37 are turned on in numerical sequence by the action of the respectively associated pulse stretchers 57 which are activated in turn by control pulses 1, 2, 3, 4, 5, and 6 received from the main gate pulse generator. These pulses appear at 60° intervals and coincide with the triggering of the respective valves 11–16 of the bridge 10. Thus each of the rectifiers 51–56 is turned on in response to turn-on of the similarly identified valve. The control pulse No. 1 and the resulting trigger signal C produced by the pulse stretcher associated with the first controlled rectifier 51 are indicated in FIGS. 4B and 4C, respectively. The trigger signal C has been stretched because the forward bias interval of 51 does not commence simultaneously with turn-on of the valve 11 under certain operating conditions such as those illustrated.

During the conducting period of the controlled rectifier 51, a relatively positive voltage is developed across the resistor 59 in series therewith, and this voltage is supplied via a wire D1 to the associated pulse generator 58. The pulse generator 58 is designed to produce a trigger signal E of desired width (e.g., 1 millisecond) commencing when the positive voltage on wire D1 terminates, which marks the end of the forward current conduction period of the controlled rectifier 51. The voltage on wire D1 and the resulting trigger signal E generated by 58 are indicated in FIGS. 4D and 4E, respectively. The latter signal is supplied to the thyristor 31 which consequently can turn on as soon as current in the main valve 11 decreases to zero. The operation of the remainder of the auxiliary gating circuits 37 is similar and therefore need not be described in detail.

As was mentioned hereinbefore, our margin angle detector is also useful in conjunction with bridges operating as line-voltage commutated inverters. Such converters are described in chapter 3, pages 55–88 of Principles of Inverter Circuits by B. D. Bedford and R. G. Hoft (John Wiley & Sons, New York, 1964). In this context the voltage between either D-C terminal P or N and neutral will have a D-C component, and therefore to avoid transformer saturation resistance voltage dividers or the like should be used in lieu of the inductive coupling means 24 and 25 for deriving secondary voltages representing the respective D-C terminal-to-neutral voltages. In addition, appropriate means can be provided for summing the resulting trains of voltages which separately are the replicas of inverse voltages across the odd-numbered valves and the even-numbered valves, respectively.

When the margin angle detector is applied as indicated in the preceding paragraph, the thyristors 31–36 can be successfully triggered by long pulses produced upon triggering the second succeeding valve of the bridge. In other words, thyristor 31 would be triggered in delayed response to turn-on of valve 13, thyristor 32 in delayed response to turn-on of valve 14, thyristor 33 in delayed response to turn-on of valve 15, etc. The delay for this purpose is as long as the overlap angle. Alternatively, diodes can be used in lieu of the thyristors 31–36. Under many operating modes and conditions of an inverting bridge, the only interval of inverse voltage across a valve is the one that exists each cycle immediately following a period of forward conduction. Even when the firing angle is advanced to a point where there is an additional inverse voltage interval per valve per cycle, it can be demonstrated that the extra interval or intervals of one valve will always be subordinate to a relevant inverse voltage interval of another valve in the sense that the inverse voltage of the one valve compared to the other is concurrent in time and is of no greater instantaneous magnitude. Thus the final series of output signals is able to provide correct information to the clipper for producing feedback signals whose durations accurately represent margin angle, even if waveform information were lost.

While we have shown and described in detail one form of our invention by way of illustration, alternative forms have been suggested and still other modifications will undoubtedly occur to those skilled in the art. Therefore we intend herein to cover all such modifications as fall within the true spirit and scope of the invention.

What we claim as new and desire to secure by Letters Patent of the United States is:

1. For use in conjunction with an electric power converter comprising first, second, third, fourth, fifth, and sixth periodically conducting electric valves connected between A-C terminals A', B', and C' and D-C terminals P and N, with said first, third, and fifth valves having cathode connected in common to P and anodes connected respectively to A', B', and C' and with said fourth, sixth, and second valves having anodes connected in common to N and cathodes connected respectively to A' B', and C', said A-C terminals being adapted to be connected to a polyphase alternating voltage system, and control signal generating means for cyclically turning on said valves in numerical sequence in synchronism with said alternating voltage, the forward current conduction period of each valve in turn being followed immediately by an interval of inverse anode-to-cathode voltage across that valve, improved means for detecting said inverse voltage interval of each valve comprising:

(a) first, second, and third means connected to the responsive A-C terminals A', B', and C' and to a reference point of said alternating voltage system for deriving two sets of electric signals representing the voltages between the corresponding A-C terminals and said reference point;

(b) fourth and fifth means connected to the respective D-C terminals P and N and to said reference point for deriving electric signals representing the voltages between the corresponding D-C terminals and said reference point;

(c) first, second, third, fourth, fifth, and sixth asymmetrically conductive devices;

(d) first summation means including said first and fourth means and said first device for developing a first voltage that is a replica of the voltage across said first valve during its inverse voltage interval, said first summation means being so arranged that the difference between the signals derived by said first and fourth means tends to forward bias said first device when the potential of P is positive with respect to A';

(e) second summation means including said second and fourth means and said third device for developing a second voltage that is a replica of the voltage across said third valve during its inverse voltage interval, said second summation means being so arranged that the difference between the signals derived by said second and fourth means tends to forward bias said third device when the potential of P is positive with respect to B';

(f) third summation means including said third and fourth means and said fifth device for developing a third voltage that is a replica of the voltage across said fifth valve during its inverse voltage interval, said third summation means being so arranged that the difference between the signals derived by said third and fourth means tends to forward bias said fifth device when the potential of P is positive with respect to C';

(g) fourth summation means including said first and fifth means and said fourth device for developing a fourth voltage that is a replica of the voltage across said fourth valve during its inverse voltage interval, said fourth summation means being so arranged that the difference between the signals derived by said first and fifth means tends to forward bias said fourth device when the potential of N is negative with respect to A';

(h) fifth summation means including said second and fifth means and said sixth device for developing a fifth voltage that is a replica of the voltage across said sixth valve during its inverse voltage interval, said fifth summation means being so arranged that the difference between the signals derived by said second and fifth means tends to forward bias said sixth device when the potential of N is negative with respect to B';

(i) sixth summation means including said third and fifth means and said second device for developing a sixth voltage that is a replica of the voltage across said second valve during its inverse voltage interval, said sixth summation means being so arranged that the difference between the signals derived by said third and fifth means tends to forward bias said second device when the potential of N is negative with respect to C'.

2. The improved detecting means of claim 1 in which all of said summation means share a common resistor whose voltage drop is the replica voltage developed by each of the summation means in turn.

3. The improved detecting means of claim 1 in which said first, second and third summation means are interconnected by means for deriving a first train of voltages comprising the composite of said first, second, and third replica voltages, and in which said fourth, fifth and sixth summation means are interconnected by means for deriving a second train of voltages comprising the composite of said fourth, fifth and sixth replica voltages.

4. The improved detecting means of claim 3 in which there is seventh summation means for producing output signals comprising the sum of the voltages in said first and second trains.

5. The improved detecting means of claim 1 in which said first through sixth asymmetrically conductive devices are thyristors, and in which auxiliary gating means is provided for triggering each of said thyristors in turn when forward current in the similarly identified valve of the inverter decreases to zero at the end of a period of conduction.

6. The improved detecting means of claim 5 in which said auxiliary gating means is coupled to said control signal generating means and operates in synchronism therewith.

7. The improved detecting means of claim 6 in which the first thyristor is triggered in delayed response to turn-on of said third valve, the second thyristor is triggered in delayed response to turn-on of said fourth valve, the third thyristor is triggered in delayed response to turn-on of said fifth valve, the fourth thyristor is triggered in delayed response to turn-on of said sixth valve, the fifth thyristor is triggered in delayed response to turn-on of said first valve, and the sixth thyristor is triggered in delayed response to turn-on of said second valve.

8. For use in conjunction with an electric power converter comprising a plurality of periodically conducting electric valves connected between A-C and D-C terminals, with a first one of said valves having a first one of its main electrodes connected to a first A-C terminal and having its other main electrode connected to one D-C terminal and with a second one of said valves having its first main electrode connected to a different A-C terminal and its other main electrode connected to said one D-C terminal, said A-C terminals being adapted to be connected to a polyphase alternating voltage system, and means for cyclically turning on all of the valves in a predetermined sequence in synchronism with said alternating voltage, the forward current conduction period of each valve in turn being followed immediately by an interval of inverse anode-to-cathode voltage across that valve, improved means for detecting said inverse voltage interval of each of said first and second valves comprising:

(a) first means connected to said first A-C terminal and to a reference point of said system for deriving an electric signal representing the voltage therebetween;

(b) second means connected to said different A-C terminal and to said reference point for deriving an electric signal representing the voltage therebetween;

(c) third means connected to said one D-C terminal and to said reference point for deriving an electric signal representing the voltage therebetween;

(d) first summation means including said first and third means and a first asymmetrically conductive device for developing a first voltage that is a replica of the voltage across said first valve during said inverse voltage interval, said first summation means being so arranged that the difference between the signals derived by said first and third means tends to forward bias said first device when there is inverse anode-to-cathode voltage across said first valve; and (e) second summation means including said second and third means and a second asymmetrically conductive device for developing a second voltage that is a replica of the voltage across said second valve during said inverse voltage interval, said second summation means being so arranged that the difference between the signals derived by said second and third means tends to forward bias said second device when there is inverse anode-to-cathode voltage across said second valve.

9. The improved detecting means of claim 8 in which there is means for deriving a train of voltages comprising a composite of said first and second voltages.

10. The improved detecting means of claim 8 in which said first and second asymmetrically conductive devices are thyristors which are respectively triggered when forward current in the similarly identified valve of the converter decreases to zero at the end of each period of conduction.

11. Improved means for producing a feedback signal representing the margin angle of a solid-state frequency multiplying converter having a plurality of A-C terminals adapted to be connected to a polyphase system of sinusoidal voltage of fundamental frequency, first and second D-C terminals adapted to be connected to one side of a single-phase A-C load circuit, and a plurality of consecutively numbered load-current conducting electric valves connected between said A-C and D-C terminals, odd-numbered valves having their cathodes connected in common to said first D-C terminal, even-numbered valves having their anodes connected in common to said second D-C terminal, and all of said valves being cyclically turned on in a proper sequence to supply the load circuit with alternating current having a frequency which is a predetermined multiple of said fundamental frequency, wherein the improvement comprises:

(a) a first potential transformer connected between said first D-C terminal and a neutral of said polyphase system and having a secondary winding for deriving a secondary voltage proportional to the cathode-to-neutral voltage of said odd-numbered valves;

(b) a second potential transformer connected between said second D-C terminal and said neutral and having a secondary winding for deriving a secondary voltage proportional to the anode-to-neutral voltage of said even-numbered valves;

(c) a plurality of additional potential transformers connected between said A-C terminals and said neutral and having a first set of secondary windings for deriving secondary voltages proportional to the respective anode-to-neutral voltages of said odd-numbered valves and a second set of secondary windings for deriving secondary voltages proportional to the respective cathode-to-neutral voltages of said even-numbered valves;

(d) a plurality of consecutively numbered thyristors, odd-numbered thyristors being individually connected in series with the different secondary windings of said first set to form therewith a plurality of first subcircuits, and even-numbered thyristors being individually connected in series with the different secondary windings of said second set to form therewith a plurality of second subcircuits;

(e) gating means for triggering said thyristors in sequence when the correspondingly numbered valves of the converter turn off at the ends of their respective periods of conduction;

(f) first circuit means for connecting the secondary winding of said first transformer in voltage-subtracting series relationship with a parallel array of said first subcircuits, each of said odd-numbered thyristors being poled to be forward biased by the secondary voltage difference that exists when there is inverse voltage across the correspondingly numbered valve;

(g) second circuit means for connecting the secondary winding of said second transformer in voltage-subtracting winding of said second transformer in voltage-subtracting series relationship with a parallel array of said second subcircuits, each of said even-numbered thyristors being poled to be forward biased by the secondary voltage difference that exists when there is inverse voltage across the correspondingly numbered valve;

(h) a resistor;

(i) means for connecting both of said first and second circuit means in parallel with said resistor, with all of the thyristors being poled to conduct current in the same direction through said resistor, whereby there is a voltage drop across said resistor throughout each of the intervals of inverse voltage which is applied across the respective valves immediately following said periods of conduction; and (j) clipping means connected across said resistor for producing a train of feedback signals which coexist with said intervals of inverse voltage.

12. The improvement of claim 11 in which said gating means is arranged to trigger each of said thyristors in turn in delayed response to turn-on of the correspondingly numbered valve.

13. The improvement of claim 12 in which said gating means comprises:

(i) means for deriving an alternating control voltage from the alternating load current, (ii) a plurality of consecutively numbered, periodically conducting controlled rectifiers connected in circuit with said control voltage deriving means and respectively forward biased by said control voltage when the correspondingly numbered valve of the converter is conducting load current, (iii) means for cyclically turning on said controlled rectifiers in sequence in response to turn-on of the correspondingly numbered valves, and (iv) means for triggering each of said thyristors in turn in response to turn-off of the correspondingly numbered control rectifier at the end of its period of conduction.

References Cited
UNITED STATES PATENTS

| | | | |
|---|---|---|---|
| 2,202,728 | 5/1940 | Bedford et al. | 321—38 X |
| 2,222,700 | 11/1940 | Bedford | 321—40 |
| 3,458,795 | 7/1969 | Ainsworth | 321—38 X |
| 3,474,321 | 10/1969 | Ainsworth | 321—38 X |

OTHER REFERENCES

IEE Transactions on Power Apparatus and Systems, "A Method to Detect the Deionization Margin Angle and to Prevent the Commutation Failure of An Inverter for DC Transmission," vol. Pas–86, No. 3, pp. 259–262, March 1967.

WILLIAM H. BEHA, JR., Primary Examiner

U.S. Cl. X.R.

321—7, 13, 38, 40